United States Patent
Zhou et al.

(10) Patent No.: US 8,493,499 B2
(45) Date of Patent: Jul. 23, 2013

(54) COMPRESSION-QUALITY DRIVEN IMAGE ACQUISITION AND PROCESSING SYSTEM

(75) Inventors: Xiaosong Zhou, Campbell, CA (US); Douglas Scott Price, San Jose, CA (US); Hsi-Jung Wu, San Jose, CA (US); Dazhong Zhang, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 476 days.

(21) Appl. No.: 12/794,475

(22) Filed: Jun. 4, 2010

(65) Prior Publication Data

US 2011/0249133 A1    Oct. 13, 2011

Related U.S. Application Data

(60) Provisional application No. 61/321,821, filed on Apr. 7, 2010.

(51) Int. Cl.
*H04N 5/235* (2006.01)
*H04N 7/12* (2006.01)
*G06K 9/36* (2006.01)

(52) U.S. Cl.
USPC .............. 348/362; 382/232; 375/240.01

(58) Field of Classification Search
USPC .............. 348/362–365; 382/232; 375/240, 375/240.01
See application file for complete search history.

(56) References Cited

U.S. PATENT DOCUMENTS

| | | | |
|---|---|---|---|
| 6,301,440 B1 * | 10/2001 | Bolle et al. | 396/128 |
| 6,778,702 B1 * | 8/2004 | Sweet | 382/191 |
| 7,092,448 B2 * | 8/2006 | Turaga et al. | 375/240.26 |
| 7,170,933 B2 * | 1/2007 | Kouloheris et al. | 375/240 |
| 8,081,227 B1 * | 12/2011 | Kim et al. | 348/211.3 |
| 8,126,197 B2 * | 2/2012 | Jones et al. | 382/100 |
| 2005/0089246 A1 * | 4/2005 | Luo | 382/286 |
| 2005/0219400 A1 * | 10/2005 | Poulsen | 348/345 |
| 2007/0288973 A1 * | 12/2007 | Glatron et al. | 725/105 |

* cited by examiner

*Primary Examiner* — Timothy J Henn
(74) *Attorney, Agent, or Firm* — Kenyon & Kenyon LLP

(57) ABSTRACT

Embodiments of the present invention provide a video encoding system in which a video coding engine establishes coding quality metrics that govern its own operation as well as the operation of a camera and/or a pre-processor. An imaging system may include an image acquisition system, a pre-processor and a coding engine. The coding engine may output a quality indicator identifying, for each portion of a video sequence currently being coded, a relatively level of coding quality that is being achieved. The imaging system further may include an image acquisition controller and a pre-processor controller that impose respective operating parameters upon the image acquisition system and the pre-processor in response to these quality indicators. In this manner, overall performance of the imaging system may be improved.

43 Claims, 3 Drawing Sheets

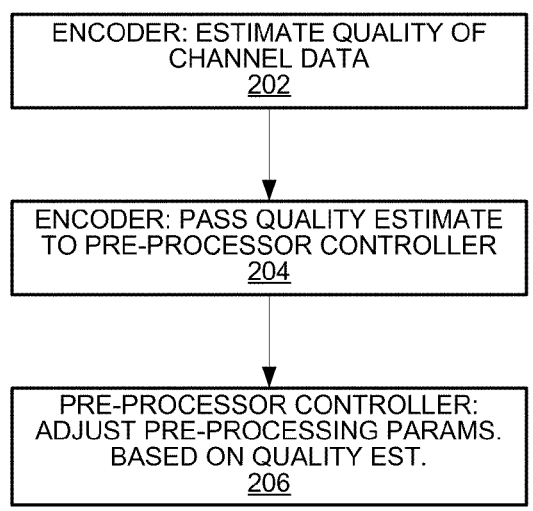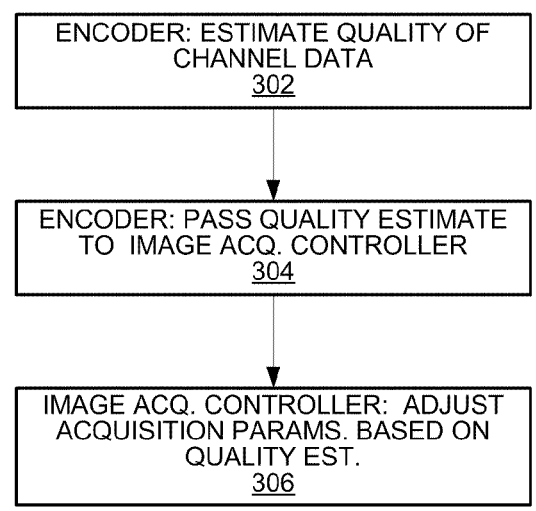
FIG. 2
200
FIG. 3
300

400

COMPRESSION-QUALITY DRIVEN IMAGE ACQUISITION AND PROCESSING SYSTEM

The present application claims the benefit of U.S. Provisional application, Ser. No. 61/321,821, filed Apr. 7, 2010, entitled "Compression-Quality Driven Image Acquisition and Processing System," the disclosure of which is incorporated herein by reference in its entirety.

BACKGROUND

Many modern consumer electronic products include imaging systems to capture, code and transfer video data to other devices. The image processing systems may vary but, typically, such systems include a camera to acquire video content and hardware and/or software driven coding systems that code the video data for transmission from the device. The coding system may include a video coder that performs data compression by various techniques to exploit spatial and/or temporal redundancy within the video signal. The video coder further may perform processing operations prior to data compression (hence, "pre-processing" operations) to condition the video signal for data compression.

Typically, the functional units that perform image acquisition, pre-processing and video coding operate independently of one another. Each unit may select operational parameters for itself according to pre-programmed control policies that are independent of the policies established for other units. For example, the acquisition module operates adaptively based on the ambient operating conditions to select optimum settings for auto exposure, white balance, focus and other operational parameters to generate best quality possible based on locally-coded quality metrics. Similarly, a pre-processing unit may dynamically select among different filtering operations (typically, de-noising filters and sharpening filters) based on its own interpretation of video content output by the camera and according to its own quality metrics. This local control can cause the different units to operate at crossed purposes at times. For example, the acquisition module may capture a hi-definition video sequence, but the video sequence need to be transmitted over a communication channel that only has a low bandwidth in real time. Thus the encoder has to aggressively cut down the bits to be transmitted and encode the video sequence into low-definition.

Accordingly, the inventors perceive a need in the art for an image acquisition and coding system in which image acquisition system, pre-processor and video coder select operational parameters jointly.

BRIEF DESCRIPTION OF THE DRAWINGS

FIG. 2 is a flow diagram of adjusting preprocessing parameters of video signals according to an embodiment of the present invention.

FIG. 3 is a flow diagram of adjusting image acquisition parameters of video signals according to an embodiment of the present invention.

DETAILED DESCRIPTION

Embodiments of the present invention provide a video encoding system in which a video coding engine establishes coding quality metrics that govern its own operation as well as the operation of a camera and/or a pre-processor. An imaging system may include an image acquisition system, a pre-processor and a coding engine. The coding engine may output a quality indicator identifying, for each portion of a video sequence currently being coded, a relatively level of coding quality that is being achieved. The imaging system further may include an image acquisition controller and a pre-processor controller that impose respective operating parameters upon the image acquisition system and the pre-processor in response to these quality indicators. In this manner, overall performance of the imaging system may be improved.

Figure 1:
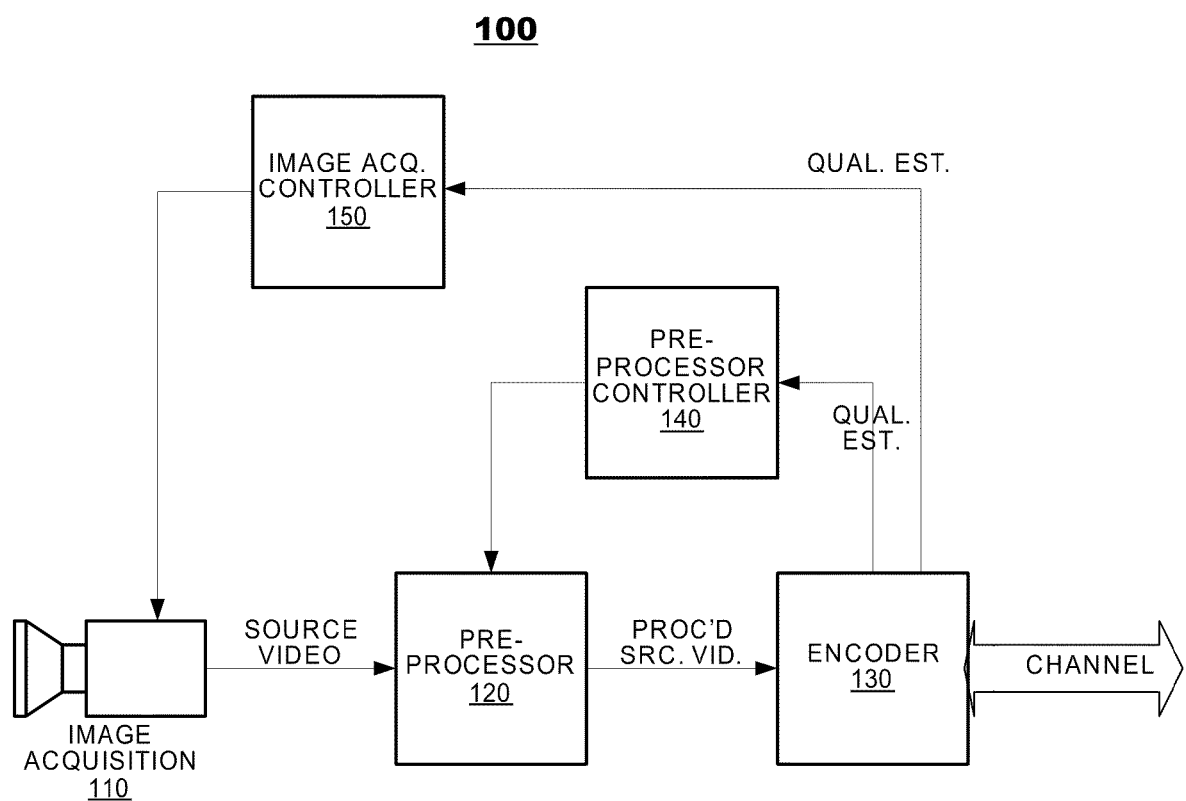
FIG. 1 is a simplified block diagram of an exemplary encoding system according to an embodiment of the present invention.

FIG. 1 is a simplified a block diagram of an imaging system 100 according to an embodiment of the present invention. The imaging system 100 may include an image acquisition sub-system 110, a pre-processor 120 and an encoder 130. The system further may include a pre-processor controller 140 and an image acquisition controller 150. The image acquisition sub-system 110 may capture image information as a video data stream. The pre-processor 120 may perform various processing operations on the video data output from the image acquisition system 110 to condition the data for coding. The encoder 130 may code the input video data to limit its bandwidth for transmission over a channel. The encoder 130 further may generate an output signal 131 (QUAL. EST.) representing an estimate of coding quality being achieved, which may be output to the pre-processor controller 140 and an image acquisition controller 150. Based on the quality estimate from the encoder 130, the pre-processor controller 140 and image acquisition controller 150 may select operational parameters of the pre-processor 120 and image acquisition sub-system 110 respectively.

More specifically, the image acquisition sub-system 110 may represent an imaging device (for example, a camera or other image sensor) and associated controls that generate a source video signal. In this regard, the image acquisition sub-system 110 may perform control operations such as auto-focus, aperture control, auto-balance and other control operations to normalize characteristics of the source video signal. In an embodiment, the image acquisition sub-system 110 may include an input from the image acquisition controller 150 that adjusts image acquisition parameters based on a quality estimate indicator output from the encoder 130.

The pre-processor 120 (e.g., a pre-processing sub-system) may perform processing operations upon the source video sequence to condition it for coding. The pre-processor 120 may perform filtering operations such as denoising filters, bilateral filters or other kinds of processing operations that condition video data output by the image acquisition system 110 for coding by the encoder 130. In an embodiment, the pre-processor 120 may include an input from the pre-processor controller 140 that adjusts pre-processing parameters based on a quality estimate indicator output from the encoder 130. In one embodiment, the pre-processor 120 may also send control information to the image acquisition system 110 based on its own statistics such as temporal noise estimation or brightness estimation.

The encoder 130 may code source images presented to it by the pre-processor 120. The encoder 130 may select coding parameters based on image content presented to it from the pre-processor 120 and also external constraints such as the bandwidth available in a channel. The coding may be performed according to a variety of compression algorithms. For example, the encoder 130 may compress the images by a motion-compensated prediction algorithm that reduces spatial and temporal redundancy in the video stream. The known MPEG-2, MPEG-4, H.263 and H.264 coding protocols are examples of such motion-compensated prediction algorithms. In so doing, the encoder 130 may select various coding parameters that often determine a quality of recovered video data that can be obtained at a decoder (not shown). The encoder 130 may output the coding parameters with the coded video data to the channel.

Indicators of Coding Quality

The present invention accommodates several indicators of coding quality, including: quantization parameter ("QP"), noise analysis, motion estimation, and channel bandwidth. In an embodiment, the encoder may 130 derive a quality estimate from currently-selected coding parameters, which may be output to the image acquisition controller 140 and/or the pre-processor controller 150. For example, as discussed below, the quality estimate may be derived from coding parameters such as quantization parameters used during coding, a state of a rate control buffer within the encoder 130, or other parameters (such as, but not limited to, estimated decoder performance, noise analysis, motion estimation, and available channel bandwidth). The encoder 130 may derive the quality estimate signal 131 from coding parameters of each frame individually or from coding parameters of a sequence of video frames.

For example, the encoder may derive a quality estimate from quantization parameters used to code input video data. Modern prediction algorithms use quantization parameters quantize transform coefficients that are generated from the coding algorithm. Such algorithms often generate several QPs per frame. Quantization is a lossy process; in many situations, quantization can truncate many coefficient values to zero, which leads to significant bandwidth conservation when the coefficient data is later entropy coded. Coefficients that are truncated to zero cannot be recovered at a decoder, however, and therefore quantization can be an indicator of coding quality. Generally, when larger QP values are used for quantization, a recovered video signal generated therefrom will have lower image quality than when a smaller quantization parameter is used.

In an embodiment, the encoder 130 may derive a quality estimate separately for each frame being coded. In this manner, the encoder 130 may generate a quality estimate from the quantization parameters used to code the frame. For example, the quality estimate may be generated from an averaging of quantization parameters from all blocks in the frame. Alternatively, the quality estimate may be derived from a weighted average that give preference to image content in an identified region of interest within a frame (for example, the center of the image).

In another embodiment, the encoder 130 may derive the quality estimate periodically for a plurality of frames. For example, the encoder 130 may generate the quality estimate from an average of all quantization parameters used in a most-recently coded frame and a predetermined number of previously-coded frames adjacent to it (say, 6 frames in total). Again, the quality estimate may be generated as an averaging or a weighted averaging that gives preference to a region of interest within the frame.

Noise analysis is another tool the encoder 130 may use to estimate coding quality. As the encoder codes source image data, it may compare the bit sizes of various frames after coding. By comparing the bit sizes of multiple frames coded with a common set of coding parameters (for example, common frame type and common QP), the encoder may identify frames coded with higher bit rates as those containing noise.

Motion estimation is another tool the encoder 130 may use to estimate coding quality. Encoders typically perform motion estimation as part of their coding processes, which generally represent motion of image content between frames. In one embodiment, frames with relatively high motion may be estimated as being coded at relatively lower quality for estimation purposes.

Channel Bandwidth is yet another tool the encoder 130 may use to estimate coding quality. Many transmission mediums are lossy and prone to time varying communication errors. The encoder 130 may monitor transmission states such as packet loss rates and other indicators of transmission quality to estimate periods of low quality for estimation. Also, the encoder may derive quality from bit rate "budgets" derived from the available channel bandwidth. For example, an encoder can code to high quality if coding for a large channel, but not for a small channel. The encoder 130 may use a rate control buffer determined by the channel bandwidth to derive a quality estimate. If the buffer is full, the encoder 130 may ask the image acquisition sub-system 110 to drop the resolution or reduce the image capturing rate, also or alternatively, the encoder 130 may ask the pre-processor 120 to increase the strength of the bilateral filter.

In addition, coding quality may be affected based on estimates of the decoder performance. For example, the encoder 130 may receive control parameters from a decoder that informs the capability of the decoder. If the decoder is capable of displaying pictures with a high quality, the encoder 130 may derive a high coding quality. If the decoder is only capable of displaying pictures with a low quality, the encoder 130 may derive a low coding quality.

Using the Quality Estimate to Control Pre-Processor Parameters

The pre-processor controller 140 may select parameters for the pre-processor 120 based on to the quality estimate signal 131 output from the encoder 130. More specifically, the pre-processing controller 140 may select types of pre-processing operations to be performed based on the quality estimate. Further, the pre-processing controller 140 may configure different types of pre-processing operations—adjusting configuration of pre-processing filters and/or the filtering strength to be applied—in response to the quality estimate signal 131. The pre-processor controller 140 also may select pre-processing operations to be applied based on characteristics of the source video. Several examples are provided below.

In an embodiment, the pre-processor controller 140 may select a type of pre-processing filter to be applied to input video in response to the quality estimate. For example, the pre-processing controller 140 may select a sharpening filter to be applied if the quality estimate indicates an extremely low quantization parameter is being used. The pre-processing controller 140 may select a smoothing filter to be applied if the quality estimate indicates an extremely high quantization parameter is being used. In both cases, the value of the quantization parameter may indicate that the corresponding filter is most appropriate to condition the input video for further coding.

Alternatively, the pre-processing controller 140 may disqualify specific filter(s) based on the quality estimate from the encoder 130. For example, the pre-processing controller 140 may disqualify a smoothing filter from being applied if the quality estimate indicates an extremely low quantization parameter is being used. The pre-processor 140 may determine whether to apply a sharpening filter to a video signal based on content of the video signal itself and perhaps an estimate of noise present in the video signal. If a high level of noise were estimated to be present, the pre-processing controller 140 may determine not to apply a sharpening filter so as not to increase the level of noise in the coding process.

Similarly, the pre-processing controller 140 may disqualify a sharpening filter from being applied if the quality estimate indicates an extremely high quantization parameter is being used.

In another embodiment, a de-noising operation of the pre-processor 120 may be adjusted according to the quality estimate signal 131. De-noising operations generally remove noise artifacts from source video sequences. Noise artifacts typically appear in source video as small aberrations in the video signal with a short time duration (perhaps a single pixel in a single frame). A denoising filter may provide effective noise elimination and improve coding efficiency by eliminating high frequency image components while at the same time maintaining appropriate image quality. Denoising filters may be controlled during operation by varying the strength of the filter as it is applied to video data. When a filter is applied at a relatively low level of strength (weak), the filter tends to allow a greater percentage of noise artifacts to propagate through the filter uncorrected than when the filter is applied at a high level of strength. A strong denoising filter, however, can induce image artifacts for portions of a video sequence that do not include noise. In an embodiment, when the quality estimate signal 131 indicates that the encoder is coding video at low quality, the pre-processor controller 140 may increase the strength of a denoising filter to eliminate high frequency components in an image presented to the encoder.

In a further embodiment, sharpening filter parameters of the pre-processor 120 may be adjusted according to the quality estimate signal 131. A sharpening filter generally enhances the edges of objects and adjusts contrast and shading characteristics, amplifying high frequencies. In an embodiment, when the quality estimate signal 131 indicates that the encoder is coding video at a low quality, the pre-processor controller 140 may reduce effects of the sharpening filter to reduce the complexity of an image frame, for example, reduce filtering strength of any sharpening filters then employed In another embodiment, a scaling operation of the pre-processor 120 may be adjusted according to the quality estimate signal 131. Scaling is the process of converting an image/video representation at a first resolution into a second image/video representation at a second resolution. For example, a conversion of the HD video captured by a high quality camera into a VGA version of the video. In an embodiment, when the quality estimate signal 131 indicates that the encoder is coding video at a low quality, the pre-processor controller 140 may engage a scaling pre-processing operation to downsize images, reducing the image resolution (or image size) of image data output to the encoder.

In one embodiment, a bi-lateral filter of the pre-processor 120 may be adjusted according to the quality estimate signal 131. A bi-lateral filter may replace a pixel's value by a weighted average of its neighbors in both space and range (pixel value). The bi-lateral filtering process may preserve sharp edges by systematically excluding pixels across discontinuities from consideration. It may adapt to the image frames by default. In an embodiment, when the quality estimate signal 131 indicates that the encoder 130 is coding video at a low quality, the pre-processor controller 140 may direct the bi-lateral filter to adapt quicker based on complexity (e.g., QP) of the image frames.

According to the present invention, the encoder 130 may set the bi-literal filter to adapt more or adapt less based on encoder's needs. The encoder 130 may also modify the strength and length of the underlying filter, i.e. the strength and number of taps of the low-pass filter that is applied to low-texture regions of an image. For example, a bilateral filter generally becomes stronger (a lower cutoff-frequency low-pass filter) for smooth regions and weaker at edges. How quickly the strength of the filter adapts to edges can be adjusted by encoder feedback such that it may adapt less quickly to edges, retaining fewer of them, if the coding quality is poor.

Using the Quality Estimate Signal to Control Image Acquisition Parameters

The imager controller 150 may select control parameters for the imager acquisition sub-system 110 based on and in response to the quality estimate signal 131. The imager controller 150 may include control logic of the imager acquisition sub-system 110, for example, auto-exposure controls, frame rate controls, etc. Additionally, the imager controller 150 may select settings for imager functions according to the quality estimate signal 131. Several examples are provided below.

In one embodiment, the exposure value of the image acquisition sub-system 110 may be adjusted according to the quality estimate signal 131. The exposure value is a measure of the amount of light allowed to hit the image sensor (e.g., brightness of the image/scene (LUMA)). Frequent LUMA changes may increase the complexity of the frames and make it more difficult to code the frames (e.g., need more bits to code each frame after a change, or have to sacrifice quality to maintain certain bit rate). Thus, according to the invention, the encoder 130 may adjust the exposure settings when the encoder 130 needs to control the bit rate and/or quality of coded frames.

The image acquisition sub-system 110 may have an auto exposure (AE) adjustment mechanism. Frequent AE changes may cause frequent LUMA changes. As part of controlling the exposure settings, the encoder 130 may adjust the AE settings to reduce sensitivity of the AE adjustment adaptively and stabilize exposure parameters. Conventional AE adjustments typically define a window around a nominal LUMA value and engage error correction controls if actual LUMA deviates from the window. In an embodiment, when the quality estimate signal 131 indicates that the encoder 130 is coding video at a low quality, the image acquisition controller 150 may amend an AE control process as follows:

If LUMA is stable but oscillates within a predetermined narrow range, suspend AE control and hold exposure settings at a fixed level.

Enlarge an AE window beyond a default window size to expand range of LUMA that is considered "stable." Variations of LUMA output that are within the enlarged AE window will not induce AE auto-correction.

If LUMA drifts outside the AE window, reset the AE window to the default window size and engage the AE auto-correction control. This operation should cause the imager to converge quickly on a new stable LUMA value. Thereafter, the amended process may be reset.

In another embodiment, a spatial sampling window of the image acquisition sub-system 110 may be adjusted according to the quality estimate signal 131. An auto-exposure process may use a central region of a frame as a sampling window for AE calculations. By contrast, conventional AE processes sample regions from multiple locations throughout the area of a frame. In an embodiment, when the quality estimate signal 131 indicates that the encoder is coding video at a low quality, the image acquisition controller 150 may amend the AE process to calculate LUMAs within the sampling window and control exposure settings of the image acquisition sub-system 110 based on the calculated LUMA.

In a further embodiment, the image acquisition controller 150 may cause the AE process to generate LUMA values at a limited number of sampling windows provided in identified areas of interest, either by zooming the field of view to a predetermined object or by operator identification. In this case, the AE process may average the LUMAs, possibly by a weighted method that emphasizes sampling windows closest to a center of the image (e.g., different areas within the window may have different levels of interest, thus given different weight).

In another embodiment, aperture value of the image acquisition sub-system 110 may be adjusted according to the quality estimate signal 131. Aperture value is another factor that may determine the amount (and angle) of light allowed to hit the image sensor, and thus controls the intensity of the light hitting an image sensor and the perceived brightness. The encoder 130 may adjust the aperture value using a quality estimate signal 131 in addition to or in lieu of adjusting AE to control the bit rate or quality of coded frames. For example, when the quality estimate signal 131 indicates a low quality, the image acquisition sub-system 110 may open up the aperture to reduce the field of view to blur the background. Also, during low-quality scenarios, the aperture value may be set to a substantially fixed state in order to reduce temporal complexity caused by quick lighting changes.

In one embodiment, the capture frame rate of the image acquisition sub-system 110 may be adjusted according to the quality estimate signal 131. The capture frame rate may represent how many frames of images to be captured per time period (e.g., 30 frames per second (fps), or 24 frames per second). In this embodiment, when the quality estimate signal 131 indicates that the encoder 130 is coding video at a low quality, the image acquisition controller 150 may change the capture frame rate of the image acquisition sub-system 110. For example, the image acquisition sub-system 110 may capture image data at 20 fps instead of 30 fps.

In one embodiment, the frame size of the image acquisition sub-system 110 may be adjusted according to the quality estimate signal 131. For example, when the quality estimate signal 131 indicates that the encoder is coding video at a low quality, the image acquisition controller 150 may change a frame size of captured video. In this embodiment, the image acquisition sub-system 110 may output captured video using smaller frames (lower resolution) than when the encoder 130 is operating at default levels.

FIG. 2 illustrates a method of adjusting parameters of the preprocessing according to estimated quality of channel data. According to the method, an encoder may estimate quality of channel data (block 202). The encoder may determine whether the transmission channel is operating under a tight constraint. If the channel is under a tight constraint (e.g., low bandwidth and low latency requirements), the encoder may estimate the output quality of the video stream under the tight constraint. For example, QP is a good indicator of the visual quality of coded frames. The encoder may also use QP to determine the complexity of the video frames to be coded. In one embodiment, complexity may be indicated by motion estimations among the frames. In another embodiment, complexity may be indicated by noise analysis. For example, two neighboring frames may be coded in same mode, and then the bit sizes are compared. If one frame has a high bit size, that frame may contain noise. In one embodiment, QP may be derived based on complexity of each coding units of a frame (e.g., a block or macroblock). QP may be obtained on a pixel-by-pixel average over the frame or a stretch of frames. Next step in method, the encoder may pass the quality estimate to a pre-processor controller to adjust pre-processing settings (block 204). Then, the pre-processor controller may adjust pre-processing parameters according to the encoder's quality estimate as described above (block 206).

FIG. 3 illustrates a method of adjusting parameters of the image acquisition according to estimated quality of channel data. It is understood that these methods of FIGS. 2 and 3 may operate in parallel. Step 302 may be the same as step 202, in which an encoder may estimate quality of channel data. Then, the encoder may pass the quality estimate to an image acquisition controller to adjust image acquisition settings (block 304). The image acquisition controller may adjust image acquisition parameters according to the encoder's quality estimate as described above (block 306).

Figure 4:
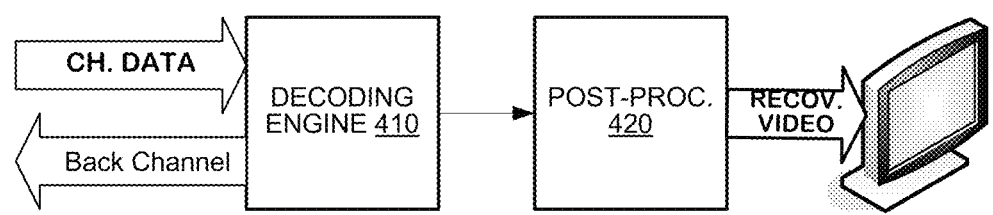
FIG. 4 is a simplified block diagram of a video decoding system according to an embodiment of the present invention.

FIG. 4 is a simplified block diagram of a video decoding system according to an embodiment of the present invention. The video decoding system 400 may include a decoding engine 410 and a post-processor 420. The decoding engine 410 may generate a recovered video sequence from channel data received from an encoder (e.g., encoder 130 of FIG. 1). In so doing, the decoding engine 410 may parse the channel data to identify prediction modes (e.g., temporal or spatial predictive modes) applied to coded pixel blocks and invert coding processes that were applied at the encoder. For example, the decoding engine may, for example, entropy decode coded pixel block data, re-quantize data according to quantization parameters provided in the channel data stream, transform de-quantized pixel block coefficients to pixel data and add predicted video content according motion-compensated prediction techniques. The decoding engine 410 may output recovered video data to a post-processor 420.

The post-processor 420 may perform additional video processing to condition the recovered video data for rendering, commonly at a display device. Typical post-processing operations may include applying deblocking filters, edge detection filters, ringing filters and the like. The post-processor 420 may output recovered video sequence that may be rendered on a display device or stored to memory for later retrieval and display.

In one embodiment, the decoding engine 410 may send control parameters via the back channel to an encoder so that the encoder may estimate the coding quality based on feed back from the decoding system. For example, the decoding engine 410 may inform the encoder the processing capability of the decoding engine, the display device, or inform the encoder the error rate, latency in the transmission.

The foregoing discussion identifies functional blocks that may be used in video coding systems constructed according to various embodiments of the present invention. In practice, these systems may be applied in a variety of devices, such as mobile devices provided with integrated video cameras (e.g., camera-enabled phones, entertainment systems and computers) and/or wired communication systems such as videoconferencing equipment and camera-enabled desktop computers. In some applications, the functional blocks described hereinabove may be provided as elements of an integrated software system, in which the blocks may be provided as separate elements of a computer program. In other applications, the functional blocks may be provided as discrete circuit components of a processing system, such as functional units within a digital signal processor or application-specific integrated circuit. Still other applications of the present invention may be embodied as a hybrid system of dedicated hardware and software components. Moreover, the functional blocks described herein need not be provided as separate units. For example, although FIG. 1 illustrates the acquisition controller 150, the image acquisition sub-system 110, the pre-processor controller 140, the pre-processor 120 and the encoder 130 as separate units, in one or more embodiments, some or all of them may be integrated and they need not be separate units. Such implementation details are immaterial to the operation of the present invention unless otherwise noted above.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A video encoding system, comprising:
a coding pipeline, comprising:
an image capture device to capture a video sequence,
a pre-processor to pre-process the captured video sequence, and
an encoder to code the pre-processed video sequence by a compression protocol,
the encoder having an output for a signal representing a quality estimate of the coding operations of the encoder; and
a controller responsive to the quality estimate signal to adjust operational parameters of a component of the coding pipeline upstream of the encoder.

2. The video encoding system of claim 1, wherein the controller adjusts adjusting parameters of the image capture device according to the quality estimate signal.

3. The video encoding system of claim 2, wherein the controller adjusts parameters of the image capture device by:
when image brightness (LUMA) is stable but oscillates within a predetermined range:
suspending a native auto-exposure AE control process of the image capture device and holding exposure settings;
enlarging an AE window of the image capture device beyond a default window size, wherein variations of LUMA output that fall within the enlarged AE window do not induce AE auto-correction by the image capture device; and
thereafter, when LUMA output drifts outside the enlarged AE window:
resetting the AE window to the default window size and re-engaging the image capture device's native AE auto-correction control.

4. The video encoding system of claim 2, wherein adjusting parameters of the image capture device includes adjusting an aperture value.

5. The video encoding system of claim 2, wherein the adjusting parameters of the image capture device includes adjusting capture frame rate.

6. The video encoding system of claim 2, wherein the adjusting parameters of the image capture device includes adjusting capture frame size.

7. The video encoding system of claim 1, wherein the controller adjusts parameters of the pre-processor according to the estimated coding quality.

8. The video encoding system of claim 7, wherein the controller adjusts parameters of a de-noising filtering process performed by the pre-processor.

9. The video encoding system of claim 7, wherein the controller adjusts parameters of a sharpening filtering process performed by the pre-processor.

10. The video encoding system of claim 7, wherein the controller adjusts parameters of a scaling process performed by the pre-processor.

11. The video encoding system of claim 7, wherein the controller adjusts parameters of a bi-lateral filtering process performed by the pre-processor.

12. The video encoding system of claim 1, wherein the quality estimate is derived from quantization parameters generated by the encoder.

13. The video encoding system of claim 1, wherein the quality estimate is derived from noise analysis performed by the encoder on its input video sequence.

14. The video encoding system of claim 1, wherein the quality estimate is derived from motion estimation performed by the encoder on its input video sequence.

15. The video encoding system of claim 1, wherein the quality estimate is derived from feedback received by the encoder from a decoder that receives coded video data from the encoder.

16. The video encoding system of claim 1, wherein the quality estimate is derived from an estimate of channel bandwidth.

17. A video encoding system, comprising:
an image acquisition module to capture a video sequence,
a pre-processing module to pre-process the captured video sequence,
an encoder to estimate coding quality while performing bandwidth compression operations on the pre-processed video sequence, and
a controller to adjust operational parameters of the pre-processing module based on the coding quality estimated by the encoder.

18. The video encoding system of claim 17, wherein the controller adjusts parameters of a de-noising filtering process performed by the pre-processor.

19. The video encoding system of claim 17, wherein the controller adjusts parameters of a sharpening filtering process performed by the pre-processor.

20. The video encoding system of claim 17, wherein the controller adjusts parameters of a scaling process performed by the pre-processor.

21. The video encoding system of claim 17, wherein the controller adjusts parameters of a bi-lateral filtering process performed by the pre-processor.

22. The video encoding system of claim 17, wherein the encoder generates a quality estimate output separately for each frame coded by the encoder based on coding parameters of the respective frame.

23. The video encoding system of claim 17, wherein the encoder generates a quality estimate output separately for each frame coded by the encoder based on coding parameters of the respective frame and a plurality of frame neighboring thereto.

24. A video encoding system, comprising:
an image acquisition module to capture a video sequence,
a pre-processing module to pre-process the captured video sequence,
an encoder to estimate coding quality while performing bandwidth compression operations on the pre-processed video sequence, and
a controller to adjust operational parameters of the image acquisition module based on the coding quality estimated by the encoder.

25. The video encoding system of claim 24, wherein the controller adjusts parameters of the image capture device by:
when image brightness (LUMA) is stable but oscillates within a predetermined range:
suspending a native auto-exposure AE control process of the image capture device and holding exposure settings;
enlarging an AE window of the image capture device beyond a default window size, wherein variations of LUMA output that fall within the enlarged AE window do not induce AE auto-correction by the image capture device; and thereafter, when LUMA output drifts outside the enlarged AE window:
resetting the AE window to the default window size and re-engaging the image capture device's native AE auto-correction control.

26. The video encoding system of claim 24, wherein adjusting parameters of the image capture device includes adjusting an aperture value.

27. The video encoding system of claim 24, wherein the adjusting parameters of the image capture device includes adjusting capture frame rate.

28. The video encoding system of claim 24, wherein the adjusting parameters of the image capture device includes adjusting capture frame size.

29. The video encoding system of claim 24, wherein the encoder generates a quality estimate output separately for each frame coded by the encoder based on coding parameters of the respective frame.

30. The video encoding system of claim 24, wherein the encoder generates a quality estimate output separately for each frame coded by the encoder based on coding parameters of the respective frame and a plurality of frame neighboring thereto.

31. A video processing method, comprising:
processing a video signal according to a processing pipeline that includes image capture, pre-processing and video compression,
estimating coding quality by the video compression, and
adjusting operational parameters of the processing pipeline upstream of the video compression based on the estimated coding quality.

32. The video processing method of claim 31, wherein the adjusting comprises:
when image brightness (LUMA) is stable but oscillates within a predetermined range:
suspending a native auto-exposure AE control process of an image capture device and holding exposure settings;
enlarging an AE window of the image capture device beyond a default window size, wherein variations of LUMA output that fall within the enlarged AE window do not induce AE auto-correction by the image capture device; and
thereafter, when LUMA output drifts outside the enlarged AE window:
resetting the AE window to the default window size and re-engaging the image capture device's native AE auto-correction control.

33. The video processing method of claim 31, wherein the adjusting comprises adjusting an aperture value of an image capturing device.

34. The video processing method of claim 31, wherein the adjusting comprises adjusting a frame capture rate of an image capturing device.

35. The video processing method of claim 31, wherein the adjusting comprises adjusting a frame capture size of an image capturing device.

36. The video processing method of claim 31, wherein the adjusting comprises adjusting parameters of a de-noising filtering pre-processing operation.

37. The video processing method of claim 31, wherein the adjusting comprises adjusting parameters of a sharpening filtering pre-processing operation.

38. The video processing method of claim 31, wherein the adjusting comprises adjusting parameters of a scaling pre-processing operation.

39. The video processing method of claim 31, wherein the adjusting comprises adjusting parameters of a bi-lateral pre-processing operation.

40. The video processing method of claim 31, wherein the quality estimate is derived from quantization parameters generated by the video compression.

41. The video processing method of claim 31, wherein the quality estimate is derived from noise analysis performed by the video compression on its input video sequence.

42. The video processing method of claim 31, wherein the quality estimate is derived from motion estimation performed by the video compression.

43. A non-transitory computer readable medium storing program instructions that, when executed by a processor-controlled device, cause the device to:
capture a video sequence according to operational parameters,
pre-process the captured video sequence according to operational parameters,
code the pre-processed video sequence as coded video data,
estimate quality of the coded video data, and
adjust the operational parameters of the capturing and/or pre-processing based on the estimated coding quality.

* * * * *